J. W. STARR.
Valve-Registers.

No. 141,521.  Patented August 5, 1873.

Witnesses.  
David L. Collier.  
J. Snowden Bell.

Inventor.  
Jesse W. Starr  
By Chas. B. Collier  
his Atty.

UNITED STATES PATENT OFFICE.

JESSE W. STARR, OF CAMDEN, NEW JERSEY.

IMPROVEMENT IN VALVE-REGISTERS.

Specification forming part of Letters Patent No. 141,521, dated August 5, 1873; application filed April 10, 1873.

*To all whom it may concern:*

Be it known that I, JESSE W. STARR, of the city and county of Camden, in the State of New Jersey, have invented certain new and useful Improvements in Valve-Registers, of which the following is a specification:

The object of my invention, which is applicable to valves, gates, sluices, or the like, which are moved longitudinally in a casing or frame by means of a screw, is to provide means for indicating to the operator the distance through which the valve gate or sluice has been moved; and my improvements consist in combining with a valve gate or sluice and the screwed stem which operates it differential gearing and an index plate and pointer, as hereinafter more fully set forth.

In the use of screw valves or gates, as ordinarily constructed, the degree of opening of the valve can only be approximately ascertained by the attendant, its proper and normal operation being dependent upon his skill and practice. My improvements are designed to afford an accurate register of the travel and consequent amount of opening of the valve or gate, and thereby to enable the supply of fluid passing through the same to be conveniently and accurately regulated.

Figure 1:
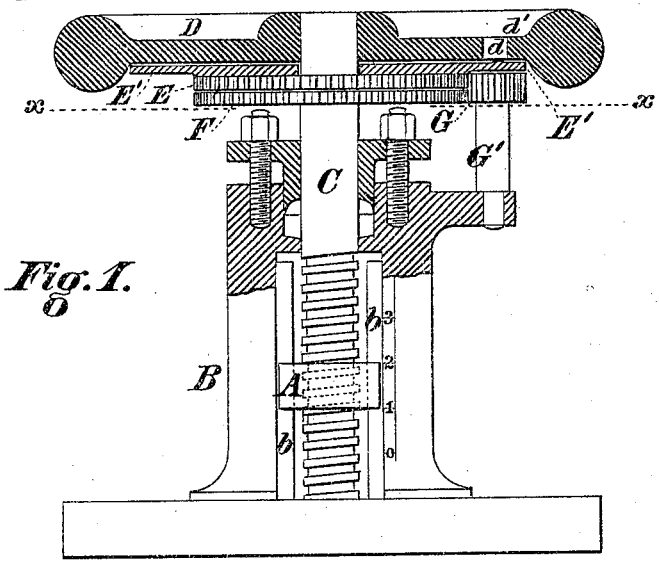
Figure 2:
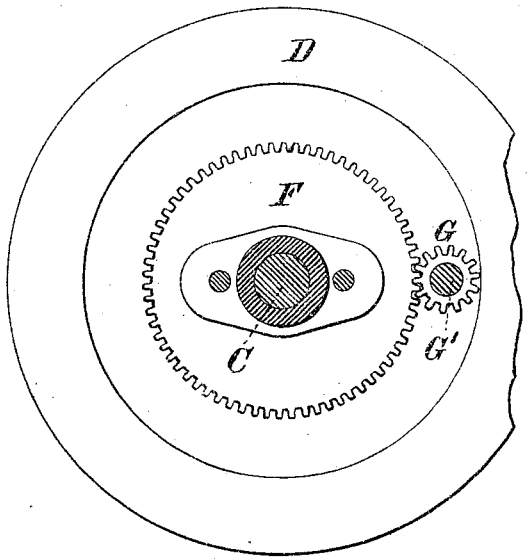
Figure 3:
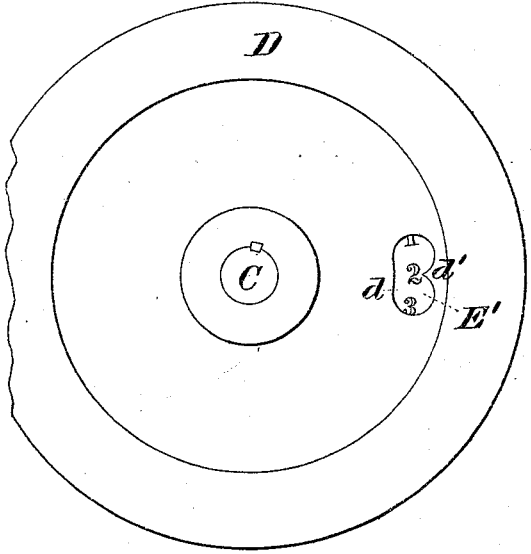

In the accompanying drawings, Figure 1 is a view, partly in elevation and partly in section, of a valve-register embodying my improvements; Fig. 2, a horizontal section through the same looking upward; and Fig. 3, a plan or top view of the same.

In the arrangement of parts exhibited in the drawings, a block, A, which may represent a valve gate or sluice, is moved vertically upon guides $b$ in a casing, B, by a screwed stem, C, being provided with a female thread for the purpose. The stem is turned to the right or left to, respectively, raise or lower the block A by means of a hand-wheel, D. Two spur-wheels, E and F, are arranged upon the stem C, the upper of which, E, is secured to or formed in a piece with an index-plate, E', having figures marked upon its upper surface to indicate the vertical travel of the block A, and is loose upon the stem C, being free to revolve with the index-plate around said stem immediately beneath the hand-wheel D. The other spur-wheel F is secured firmly upon the stem C, and consequently revolves with it under the spur-wheel E. A spur-pinion, G, is journaled upon and revolves freely on a stud, G', properly secured to the casing B. The spur-wheels E and F, both of which mesh into the pinion G, are of equal diameters but of different pitch, and consequently differ as to the number of their teeth and the speed at which they, respectively, revolve. For example, if the upper spur-wheel E, to which the index-plate is connected, has a greater number of teeth than the lower spur-wheel F, which is fast upon the stem C, the index-plate will revolve more slowly than the stem and hand-wheel, and, conversely, if the wheel E has a less number of teeth than the wheel F, the index-plate will revolve faster than the hand-wheel. An opening, $d$, is formed in the hand-wheel, through which the figures marked on the index-plate can be seen, and a pointer, $d'$, is formed on one side of the opening to indicate, by its position relative to the figures, the travel of the valve.

The relative pitches of the spur-wheels E and F and the distances between the figures on the index-plate are so proportioned that the difference in speed between the hand-wheel and the index-plate caused by the employment of the differential gearing hereinbefore described—or, in other words, the amount of distance which the faster-moving member overruns the slower—will be such that the numbered distance indicated by the pointer upon the index-plate will exactly correspond with the lineal travel of the valve or gate, and the operator can consequently accurately adjust the opening of the same to the requirements of the service in which it is employed.

In the operation of the register the pinion G is driven by the spur-wheel F when the valve-stem is rotated, and in its turn drives the spur-wheel E, and with it the index-plate E'.

My improvements are readily applicable to the various valves, gates, or sluices employed in steam, gas, and hydraulic engineering, to gate motions for water-wheels and the like, and by substituting an automatic mechanical register for the inaccurate adjustment ordinarily dependent upon the skill and attention of the operator, fill a requirement the importance of which will be readily apparent to those skilled in constructions of which valves form a part.

I am aware that indicators for determining the position of valves have been heretofore known and used, and do not, therefore, broadly, claim such device.

I claim as my invention, and desire to secure by Letters Patent—

1. The combination, with a valve moving longitudinally in a casing or frame and a threaded stem operating said valve, of a spur-wheel fast upon the valve-stem, a spur-wheel of different pitch attached to an index-plate and loose on said stem, and a spur-pinion meshing into both the spur-wheels, these members being combined for joint operation, substantially as and for the purpose set forth.

2. The combination of a valve-stem, a hand-wheel pointer fast thereon, and an index-plate loose thereon, and differential gearing to operate the index-plate, substantially as and for the purpose set forth.

JESSE W. STARR.

Witnesses:
JOHN S. R. CASSADY,
JAMES M. CASSADY.